United States Patent
Jung Mok et al.

[11] Patent Number: 5,923,390
[45] Date of Patent: Jul. 13, 1999

[54] LIQUID CRYSTAL DISPLAY WITH HIGH APERTURE RATIO AND METHOD FOR MANUFACTURING THE SAME

[75] Inventors: Jun Jung Mok, Seoul; Lee Deuk Su, Suwon; Ryu Bong Yeol, Wonju, all of Rep. of Korea

[73] Assignee: Hyundai Electronics Industries Co., Ltd., Kyoungki-Do, Rep. of Korea

[21] Appl. No.: 09/104,471

[22] Filed: Jun. 25, 1998

[30] Foreign Application Priority Data

Jun. 26, 1997 [KR] Rep. of Korea ...................... 97-27642

[51] Int. Cl.$^6$ ........................... G02F 1/1343; G02F 1/136
[52] U.S. Cl. ................................ 349/38; 349/42; 349/43; 349/147
[58] Field of Search ................................ 349/147, 38, 42, 349/43

[56] References Cited

U.S. PATENT DOCUMENTS

| | | | |
|---|---|---|---|
| 5,212,574 | 5/1993 | Katayama et al. | 349/147 |
| 5,657,101 | 8/1997 | Cheng | 349/42 |
| 5,680,190 | 10/1997 | Michibayashi et al. | 349/147 |
| 5,745,195 | 4/1998 | Zhang | 349/38 |
| 5,767,927 | 6/1998 | Jang | 349/38 |
| 5,831,692 | 11/1998 | Lee | 349/38 |
| 5,835,168 | 11/1998 | Takeda et al. | 349/38 |
| 5,859,677 | 1/1999 | Watanabe et al. | 349/38 |

*Primary Examiner*—William L. Sikes
*Assistant Examiner*—Tarifur R. Chowdhury
*Attorney, Agent, or Firm*—Selitto & Associates

[57] ABSTRACT

A liquid crystal display comprising: a transparent insulating substrate; a plurality of gate bus lines and a plurality of data bus lines arranged normal to the plurality of gate bus lines on the transparent insulating substrate, wherein a unit pixel region is defined by a region bounded by a pair of gate bus lines and a pair of data bus lines; a first electrode arranged parallel to the gate bus line within the unit pixel region; a first insulating layer formed on the first electrode; a second electrode formed at a selected portion of upper surface of the first insulating layer; a first transparent electrode formed within the unit pixel region, the first transparent electrode being apart by a selected distance from the second electrode, and being in contact with the first electrode; a second insulating layer formed on upper surface of the first insulating layer including the first transparent electrode and the second electrode; a second transparent electrode formed on the second insulating layer, the second transparent electrode being overlapped partially with the pair of gate bus lines and the pair of data bus lines, and being in contact with the second electrode through the second insulating layer; and a switching element electrically connected with the second transparent electrode.

25 Claims, 5 Drawing Sheets

LIQUID CRYSTAL DISPLAY WITH HIGH APERTURE RATIO AND METHOD FOR MANUFACTURING THE SAME

BACKGROUND OF THE INVENTION

The present invention generally relates to a display. More particularly, the present invention relates to a liquid crystal display having double layer structured transparent pixel electrodes and thereby showing high aperture ratio. The present invention also provides a method for manufacturing the same.

In many applications, liquid crystal displays("LCDs") have replaced cathode ray tubes, which are commonly known as "CRTs" for a variety of reasons. In particular, LCDs are much thinner and generally lighter in weight than conventional CRTs. More wide applications using LCDs are desiring a variety of features such as making the panel size larger, enhancing transmittance of incident light, enhancing contrast ratio, widening viewing angle, and reducing response time.

There are provided three methods for enhancing transmittance of incident light. First is improving aperture ratio, second is use of a polarizing plate with high transmittance, and third is use of a color filter with high transmittance. Among these three methods, the first method of improving aperture ratio is most widely used.

Figure 1:
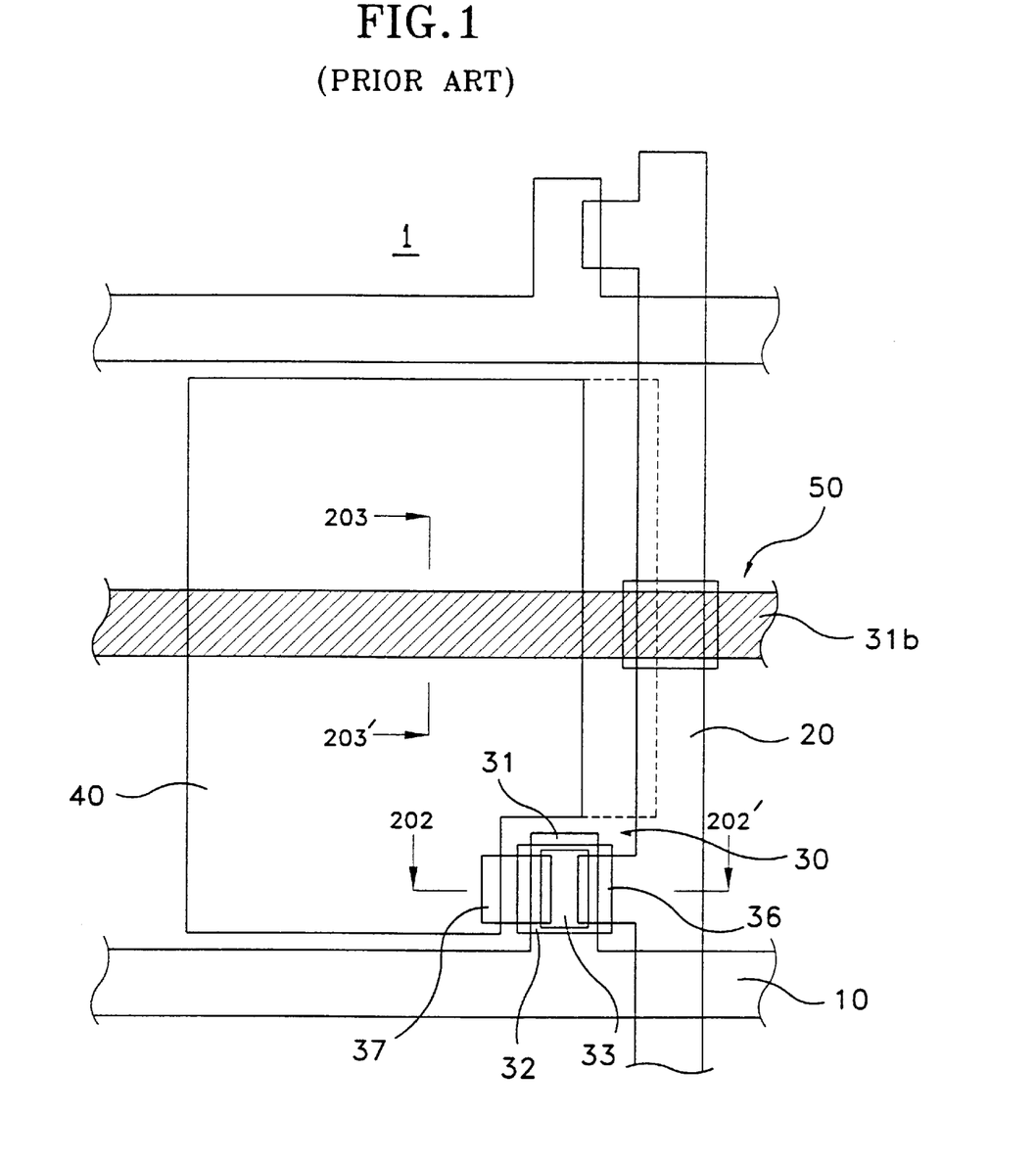
FIG. 1 is a simplified plan view of a conventional liquid crystal display.

FIG. 1 shows a conventional liquid crystal display having a thin film transistor as a switching element for switching data signals applied to a pixel electrode.

Referring to FIG. 1, there is provided a transparent insulating substrate 1. Although not shown in the drawing, another transparent insulating substrate confronts the transparent insulating substrate 1 with a liquid crystal layer intervening therebetween. A gate bus line 10 and a data bus line 20 are arranged on inner surface of the transparent insulating substrate 1, and the lines 10 and 20 are orthogonal to each other. On the crossing point of the lines 10 and 20, there is provided a thin film transistor 30. The thin film transistor 30 includes a gate electrode 31 extended from the gate bus line 10, a source electrode 36 extended from the data bus line 20, a drain electrode 37 apart by a selected distance from the source electrode 36, and a channel layer 33 acting as a path for carrier transmission from the source electrode 36 to the drain electrode 37, or vice versa. Here, a unit pixel region is defined as a region bounded by the gate bus line 10 and the data bus line 20. A transparent pixel electrode 40 is formed within the unit pixel region. The transparent pixel electrode 40 is spaced apart by a selected distance from the gate bus line 10, and the data bus line 20. The transparent pixel electrode 40 is connected to the drain electrode 37 of the thin film transistor 30. A storage electrode 31b is arranged parallel with the gate bus line 10, and is disposed between a pair of gate bus lines.

Figure 2:
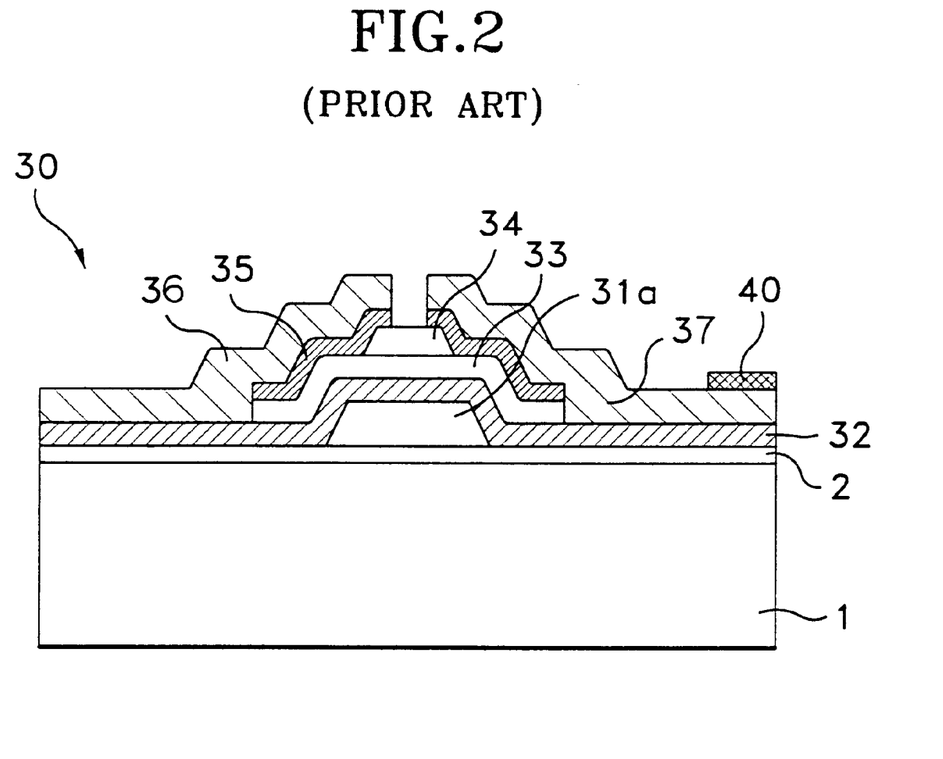
FIG. 2 is a simplified sectional view taken along a line 202–202' of FIG. 1.

FIG. 2 is a simplified sectional view taken along a line 202–202' of FIG. 1. Referring to FIG. 2, the gate electrode 31a is disposed over the transparent insulating substrate 1 on which a first insulating layer 2 is formed. A second insulating layer or gate insulating layer 32 is formed on entire surface of a first resultant substrate on which the first insulating layer 2 and the gate electrode 31a are formed. On a selected portion of upper surface of the gate insulating layer 32 is disposed a semiconductor layer 33 acting as the channel layer. An etch stopper for preventing etch of the semiconductor layer 33 is provided on a selected portion of upper surface of the semiconductor layer 33, and protects the underlying semiconductor layer 33 from-external environment. The source electrode 36 and the drain electrode 37 are disposed on the semiconductor layer 33. Between the source electrode 36 and the semiconductor layer 33 and between the drain electrode 37 and the semiconductor layer 33 is disposed an ohmic contact layer 35 of doped amorphous silicon for ohmic contact with the source and drain electrodes 36 and 37.

Figure 3:
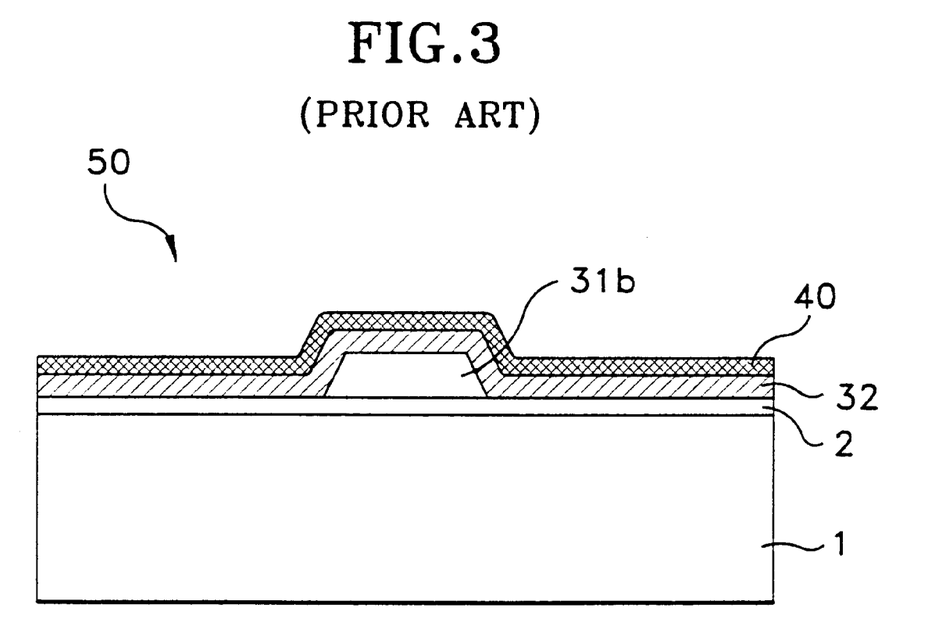
FIG. 3 is a simplified sectional view taken along a line 203–203' of FIG. 1.

FIG. 3 is a simplified sectional view taken along a line 203–203' of FIG. 1. Referring to FIG. 3 and FIG. 1, the storage electrode 31b forms a storage capacitor 50 with the overlying transparent pixel electrode 40 and the gate insulating layer 32 sandwiched therebetween.

Returning to FIG. 1, the separation between the transparent pixel electrode 40 and the data bus line 20 adjacent thereto is to prevent horizontal crosstalk between them. With such a structure, however, it is often difficult to sufficiently secure both of storage capacitance and aperture ratio. So as to remove such limitation, there is provided an overlapping structure which the transparent pixel electrode 40 overlaps with the data bus line 20 as shown by dotted lines of FIG. 1. The overlapping structure makes it possible to obtain high aperture ratio of 80% or more, but it still has a shortcoming such as vertical crosstalk between overlapping portion of the transparent pixel electrode 40 and the data bus line 20. In addition, there is further provided a structure which uses a material having a comparatively low dielectric constant as the insulating layer disposed between them, but the structure has a shortcoming to decrease the storage capacitance.

SUMMARY OF THE INVENTION

Accordingly, it is an object of the present invention to attain high aperture ratio without decrease in storage capacitance.

According to one aspect of the invention, there is provided a liquid crystal display. The liquid crystal display comprises: a transparent insulating substrate; a plurality of gate bus lines and a plurality of data bus lines arranged normal to said plurality of gate bus lines on the transparent insulating substrate, wherein a unit pixel region is defined by a region bounded by a pair of gate bus lines and a pair of data bus lines; a first electrode arranged parallel to said gate bus line within said unit pixel region; a first insulating layer formed on said first electrode; a second electrode formed at a selected portion of upper surface of said first insulating layer; a first transparent electrode formed within said unit pixel region, said first transparent electrode being apart by a selected distance from said second electrode, and being in contact with said first electrode; a second insulating layer formed on upper surface of said first insulating layer including said first transparent electrode and said second electrode; a second transparent electrode formed on said second insulating layer, said second transparent electrode being overlapped partially with the pair of gate bus lines and the pair of data bus lines, and being in contact with said second electrode through said second insulating layer; and a switching element electrically connected with said second transparent electrode.

According to another aspect, a liquid crystal display comprises: a transparent insulating substrate; a plurality of gate bus lines and a plurality of data bus lines arranged normal to said plurality of gate bus lines on the transparent insulating substrate, wherein a unit pixel region is defined by a region bounded by a pair of gate bus lines and a pair of data bus lines; a first electrode arranged parallel to said gate bus line within said unit pixel region, said first electrode comprising a first portion with a first width and a second portion with a second width which is greater than said first width; a first insulating layer formed on said first electrode; a second electrode formed at a selected portion of upper surface of said first insulating layer; a first transparent electrode formed within said unit pixel region, said first transparent electrode being apart by a selected distance from said second electrode, and being in contact with said first electrode; a second insulating layer formed on upper surface of said first insulating layer including said first transparent electrode and said second electrode; a second transparent electrode formed on said second insulating layer, said second transparent electrode being overlapped partially with the pair of gate bus lines and the pair of data bus lines, and being in contact with said second electrode through said second insulating layer; and a switching element electrically connected with said second transparent electrode.

According to a further aspect, there is provided a method for a liquid crystal display comprising a first capacitor formed by double layer structured transparent pixel electrodes formed on a transparent insulating substrate; and a second capacitor formed by double layer structured first and second electrodes, said first and second capacitors being electrically connected with a thin film transistor comprising source, drain, and gate electrodes. The method comprises the steps of: forming the first electrode, a gate bus line, and the gate electrode on a transparent insulating substrate, the first electrode being arranged parallel to said gate bus line, a first interval apart from said gate bus line; forming a first insulating layer on a first resultant substrate including said gate bus line and said first electrode; forming a semiconductor layer on a selected portion of upper surface of said first insulating layer over said gate electrode;
forming a first through hole in said first insulating layer such that a selected portion of said first electrode underlying said first insulating layer is exposed; forming a first transparent electrode in contact with said first electrode through said first through hole on said first insulating layer; simultaneously forming a second electrode, a data bus line orthogonal to said gate bus line, and being apart from said first transparent electrode, and source and drain electrodes apart from each other on said selected portions of upper surface of said first insulating layer;
forming a second insulating layer on a second resultant substrate including at least said drain electrode and said second electrode; forming a second through hole exposing a selected portion of said drain electrode, and a third through hole exposing a selected portion of said second electrode in said second insulating layer; and forming a second transparent electrode in contact with said drain electrode through said second through hole and said second electrode through said third through hole on said second insulating layer, wherein said second transparent electrode is partially overlapped with said gate bus line and said data bus line.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Hereinbelow, selected embodiments of the present invention will be explained in detail with reference to the accompanying drawings. These drawings are merely illustrations and should not limit the scope of the claims herein. One of ordinary skill in the art would recognize other variations, modifications, and alternatives.

Figure 4:
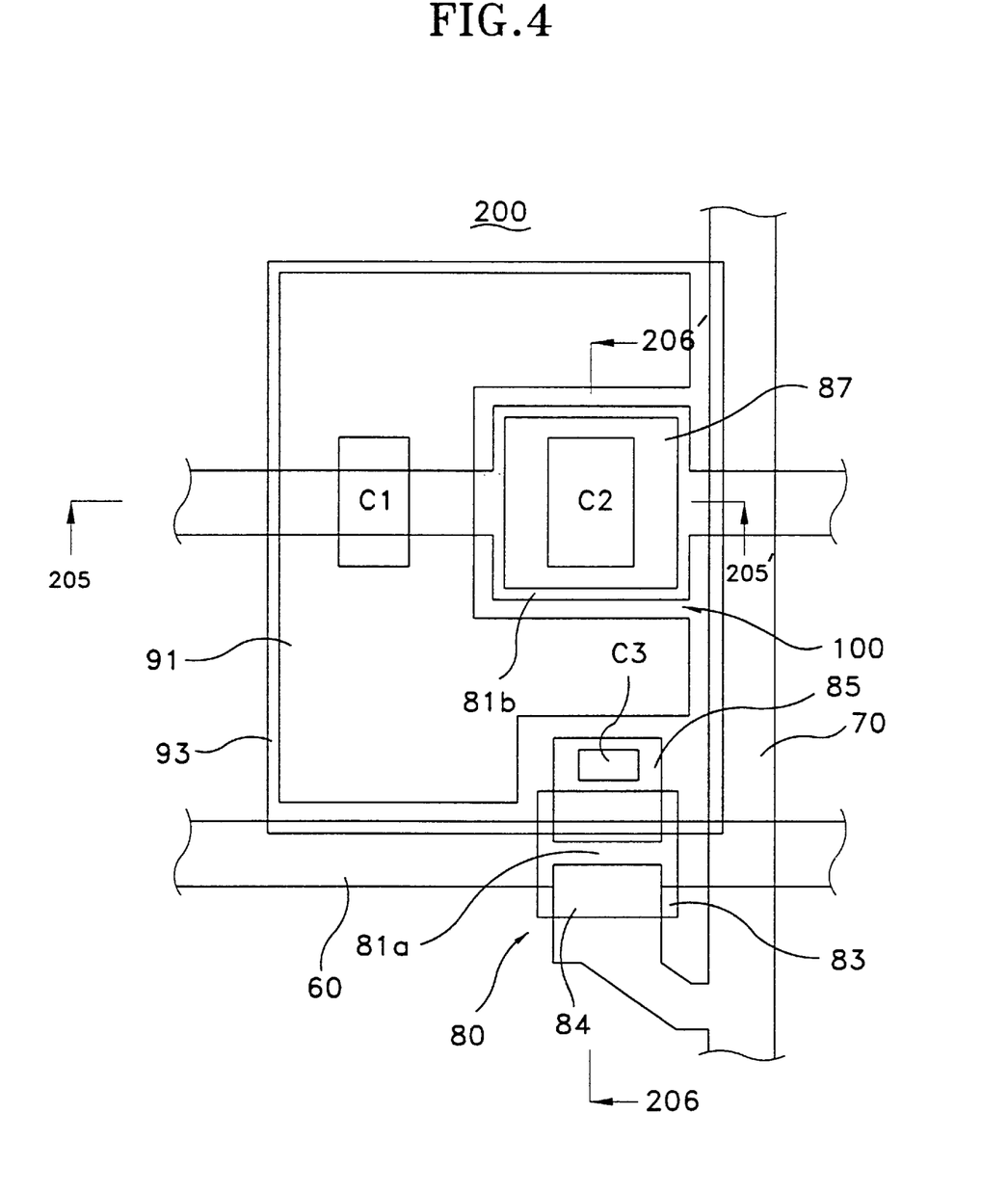
FIG. 4 is a simplified plan view of unit pixel region in a liquid crystal display of the present invention.

FIG. 4 is a simplified plan view of unit pixel region in a liquid crystal display of the present invention.

Referring to FIG. 4, a gate bus line 60 and a data bus line 70 which is arranged normal to the gate bus line 60, are placed on a transparent insulating substrate 200 such as a glass substrate. On a crossing point of the gate bus line 60 and the data bus line 70 is arranged a thin film transistor 80. Here, a unit pixel region is defined as a region bounded by the gate bus line 60 and the data bus line 70. At a central portion of the unit pixel region, a first electrode 81b or lower electrode is arranged parallel to the gate bus line 60. The first electrode 81b consists of a first portion and a second portion with different widths each other. The first portion is close to the data bus line 70, while the second portion is distant from the data bus line 70. The first portion is greater in width than the second portion. The first portion has a quadrangle plate structure. On the second portion of the first electrode 81b is disposed a second electrode or upper electrode 87 of a quadrangle plate structure with an insulating layer intervening therebetween. A first transparent pixel electrode(or third electrode) 91 is formed within the unit pixel region. The first transparent pixel electrode 91 is spaced apart by a selected distance from the gate bus line 60, the data bus line 70, the second portion of the first electrode 81b and the thin film transistor 80. The first transparent pixel electrode 91 overlaps with the first portion of the first electrode 81b. On the first transparent pixel electrode 91 is arranged a second transparent pixel electrode 93(or fourth electrode) with an insulating layer intervening therebetween. The second transparent pixel electrode 93 is completely overlapped with the first electrode 81b and the first transparent pixel electrode 91, and is partially overlapped with the gate bus line 60 and the data bus line 70. The first portion of the first electrode 81b is in contact with the overlying first transparent pixel electrode 91 at C1, and the second portion of the first electrode 81b is in contact with the overlying second electrode 87 at C2. The thin film transistor 80 includes a source electrode 84 extended from the data bus line 70, drain electrode 85 spaced apart by a selected distance from the source electrode 84, a gate electrode 81a extended from the gate bus line 60, and a channel layer 83 of semiconductor layer such as amorphous silicon. The channel layer 83 provides a path for the flow of carrier from the source electrode 84 to the drain electrode 85 or vice versa. The drain electrode 85 of the thin film transistor 80 is in contact with the overlying second transparent pixel electrode 93 at C3.

Figure 5:
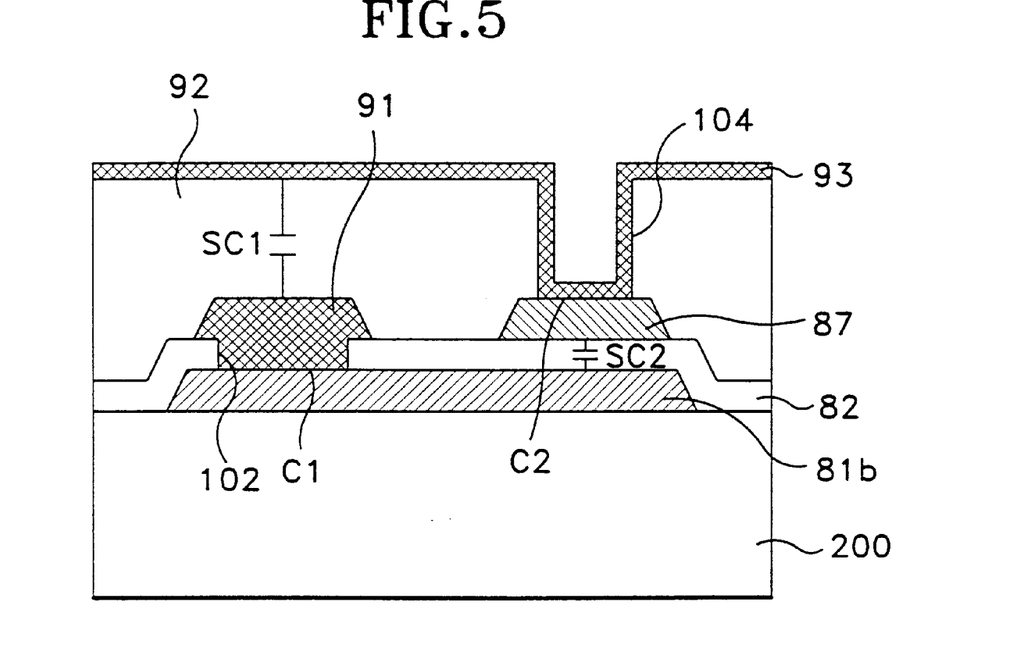
FIG. 5 is a simplified sectional view taken along a line 205–205' of FIG. 4.
Figure 7:
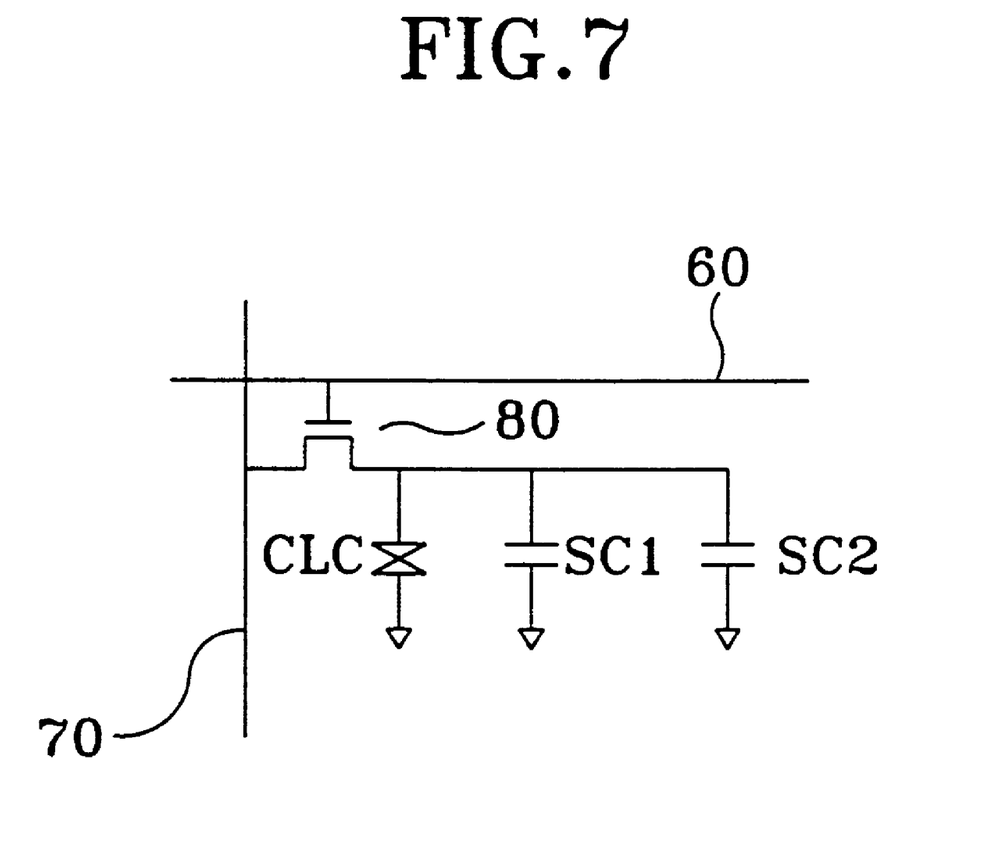
FIG. 7 is an equivalent circuit diagram.

FIG. 5 is a simplified sectional view taken along a line 205–205' of FIG. 4. Referring to FIG. 5, a first insulating layer 82 with high dielectric constant is formed on upper surface of the first electrode 81b. A first through hole 102 is formed at a selected portion of the first insulating layer 82. The first transparent pixel electrode 91 is in contact with the first electrode 81b through the first through hole 102 at C1. The second electrode 87 is formed on a selected portion of the first insulating layer 82. On the first insulating layer 82 including the first transparent pixel electrode 91 and the second electrode 87 is formed a second insulating layer 92 with comparatively low dielectric constant of 2.5–3.6. The second transparent pixel electrode 93 is formed on the second insulating layer 92, and is in contact with the underlying second electrode 87 through the second through hole 104 at C2. From the above structure, a first storage capacitor SC1 is formed by the first transparent pixel electrode 91, the second transparent pixel electrode 93, and the second insulating layer 92 intervening therebetween. A second storage capacitor SC2 is formed by the first electrode 81b, the second electrode 87, and the first insulating layer 82 intervening therebetween. In the present embodiment, the first and second storage capacitor SC1 and SC2 are connected with liquid crystal capacitor CLC in parallel as shown in FIG. 7.

Figure 6:
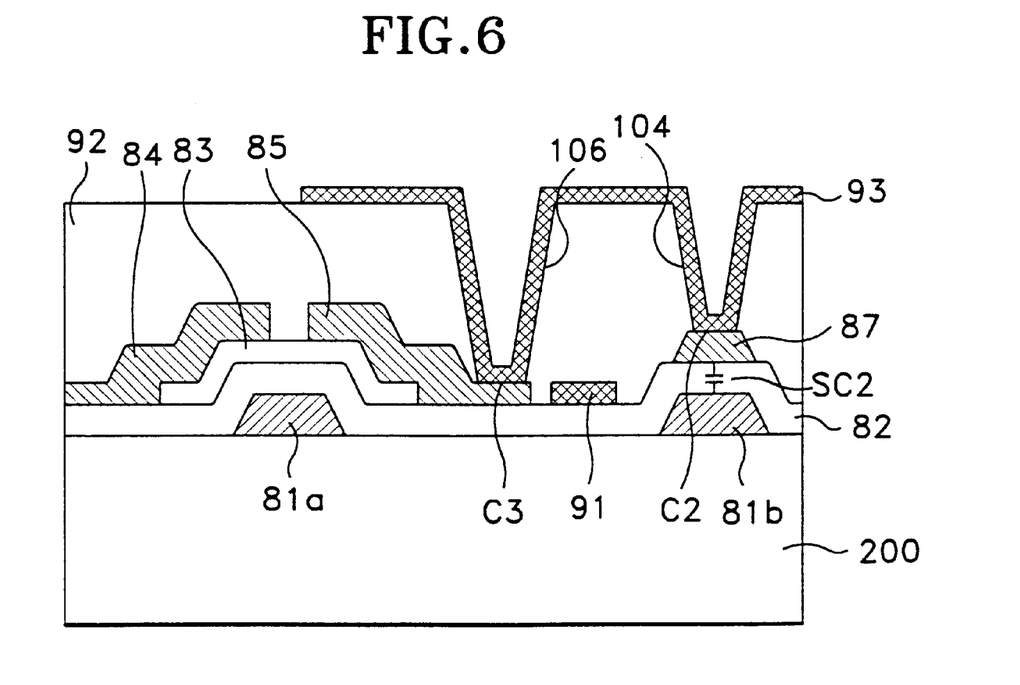
FIG. 6 is a simplified sectional view taken along a line 206–206' of FIG. 4.

FIG. 6 is a simplified sectional view taken along a line 206–206' of FIG. 4, and shows the thin film transistor and adjacent portion thereof.

Referring to FIG. 6, as described in FIG. 4, the gate electrode 81a and the first electrode 81b are formed on the transparent insulating substrate 200, and are spaced apart by a selected distance from each other. The first insulating layer 82 is formed on the substrate 200 including the gate electrode 81a and the first electrode 81b. The semiconductor layer 83 of amorphous silicon is disposed at a selected portion of upper surface of the first insulating layer over the gate electrode 81a. The source electrode 84 and the drain electrode 85 are disposed on the semiconductor layer 83 and the first insulating layer 82, and is spaced apart by a selected distance from each other. The drain electrode 85 is in contact with the second transparent pixel electrode 93 through a third through hole 106 at C3. extended from the data bus line 70, the drain electrode 85 spaced apart by a selected distance from the source electrode 84, extended from the gate bus line 60, the first and a channel layer 83 of semiconductor layer such as amorphous silicon. The channel layer 83 provides a path for the flow of carrier from the source electrode 84 to the drain electrode 85 or vice versa. The drain electrode 85 of the thin film transistor 80 is in contact with the overlying second transparent pixel electrode 93 at C3. As described in FIG. 5, the second transparent pixel electrode 93 is also in contact with the second electrode through the second through hole 104.

Although not shown in FIG. 6, a material for etch stopper may be formed on the semiconductor layer 83 as shown in FIG. 2 and doped amorphous silicon layer, for example N+ amorphous silicon("a-Si") layer for ohmic contact with the source and drain electrodes 84 and 85 may intervene respectively between the semiconductor layer 83 and the source and drain electrodes 84 and 85.

As shown in the equivalent circuit of FIG. 7, the first storage capacitor SC1 and the second storage capacitor SC2 are connected in parallel with respect to the liquid crystal capacitor CLC. Therefore, the present LCD can secure a sufficient capacitance for high aperture ratio. And, since the first transparent pixel electrode 91 does not overlap with the data bus line 70 as shown in FIG. 4, crosstalk between them is prevented.

Next, a method for the liquid crystal display having the above described structure will be explained with reference to the accompanying drawings.

A first conductor of opaque metal such as titanium("Ti"), tantalum("Ta"), aluminum("Al") or mow, is deposited on the transparent insulating substrate 200 and is then patterned to form the gate electrode 81a, the first electrode 81b acting as lower electrode of the second storage capacitor SC2, and the gate bus line 60. Meanwhile, as the first conductor, transparent electrode such as indium tin oxide can be also used for simplification of the fabrication process thereof. Thereafter, the first insulating layer 82 or gate insulating layer with comparatively high dielectric constant is formed on entire surface of a first resultant substrate which the gate electrode 81a, the first electrode 81b, and the gate bus line 60 are formed. Afterwards, the semiconductor layer 83 of amorphous silicon is formed on a selected portion of the first insulating layer 82. The first through hole 102 is formed by etching a selected portion of the first insulating layer 82 such that upper surface of the first electrode 81b is exposed. Thereafter, transparent conductive material such as indium tin oxide is deposited on entire surface of a second resultant substrate including the first through hole 102, and is then patterned, to thereby form the first transparent pixel electrode 91 which is in contact with the underlying first electrode 81b at Cl as shown in FIG. 5. Next, a second conductor of opaque metal such as titanium("Ti"), tantalum ("Ta"), aluminum("Al") or MoW is deposited on a third resultant substrate which the first transparent pixel electrode 91 is deposited, and is then patterned to form the data bus line 70 apart by a selected distance from the first transparent pixel electrode 91, the source electrode 84, the drain electrode 85, and the second electrode 87. Afterwards, a photoresist film with a comparatively low dielectric constant of about 2.5 to about 3.6 is spin-coated to a thickness of about 1 $\mu$m to about 3 $\mu$m and is then cured, to thereby form the second insulating layer 92. Thereafter, the second insulating layer 92 is patterned by a conventional photolithography method such that the second electrode 87 and the drain electrode 85 are exposed, thereby to form the second through hole 104 and the third through hole 106. Next, a transparent conductor such as indium tin oxide is deposited on entire surface of a fourth resultant substrate which the second through hole 104 and the third through hole 106 are formed, and is then patterned to form the second transparent pixel electrode 93 which is in contact with the second electrode 87 through the second through hole 104 at C2 and the drain electrode 85 of the thin film transistor 80 through the third through hole 106 at C3. At this time, the second transparent pixel electrode 93 is formed such that it overlaps partially with the data bus line 70 and the gate bus line 60.

As described above, according to the present invention, since two storage capacitors are provided for unit pixel of the liquid crystal display, sufficient storage capacitance can be secured. As a result, picture quality is improved.

Further, since the pixel electrode consists of double layer structured transparent electrodes of lower and upper transparent electrodes and the lower transparent electrode can be formed apart by a large distance from the data bus line due to the existence of the upper transparent electrode, horizontal crosstalk between the data bus line and the pixel electrode can be prevented. Furthermore, since a material with comparatively low dielectric constant is used for a storage capacitor in the overlapping portion of extended portion of the upper pixel electrode and the data bus line, vertical crosstalk can be prevented. Moreover, since the upper transparent electrode is extended to selected portions of the data bus line and the gate bus line, high aperture can be secured.

Various other modifications will be apparent to and can be made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display comprising:
   a transparent insulating substrate;
   a plurality of gate bus lines and a plurality of data bus lines arranged normal to said plurality of gate bus lines on the transparent insulating substrate, wherein a unit pixel region is defined by a region bounded by a pair of gate bus lines and a pair of data bus lines;
   a first electrode arranged parallel to said pair of gate bus line within said unit pixel region;
   a first insulating layer formed on said first electrode;
   a second electrode formed at a selected portion of an upper surface of said first insulating layer;
   a first transparent electrode formed within said unit pixel region, said first transparent electrode being apart by a selected distance from said second electrode, and being in contact with said first electrode;
   a second insulating layer formed on an upper surface of said first insulating layer including said first transparent electrode and said second electrode;
   a second transparent electrode formed on said second insulating layer, said second transparent electrode being overlapped partially with the pair of gate bus lines and the pair of data bus lines, and being in contact with said second electrode through said second insulating layer; and
   a switching element electrically connected with said second transparent electrode.

2. The liquid crystal display in claim 1, wherein said first and second transparent electrode is made of same material.

3. The liquid crystal display in claim 2, wherein the first and second transparent electrode is indium tin oxide.

4. The liquid crystal display in claim 1, wherein said first electrode is made of a material same as said data bus line.

5. The liquid crystal display in claim 1, wherein said transparent insulating substrate is a glass substrate.

6. The liquid crystal display in claim 1, wherein said switching element is a thin film transistor.

7. The liquid crystal display in claim 1, wherein said second insulating layer is smaller in dielectric constant than said first insulating layer.

8. The liquid crystal display in claim 7, wherein said second insulating layer is dielectric having a dielectric constant of about 2.5 to about 3.6.

9. A liquid crystal display with high aperture ratio comprising:
   a transparent insulating substrate;
   a plurality of gate bus lines and a plurality of data bus lines arranged normal to said plurality of gate bus lines on the transparent insulating substrate, wherein a unit pixel region is defined by a region bounded by a pair of gate bus lines and a pair of data bus lines;
   a first electrode arranged parallel to said pair of gate bus line within said unit pixel region, said first electrode comprising a first portion with a first width and a second portion with a second width which is greater than said first width;
   a first insulating layer formed on said first electrode;
   a second electrode formed at a selected portion of an upper surface of said first insulating layer;
   a first transparent electrode formed within said unit pixel region, said first transparent electrode being apart by a selected distance from said second electrode, and being in contact with said first electrode;
   a second insulating layer formed on an upper surface of said first insulating layer including said first transparent electrode and said second electrode;
   a second transparent electrode formed on said second insulating layer, said second transparent electrode being overlapped partially with the pair of gate bus lines and the pair of data bus lines, and being in contact with said second electrode through said second insulating layer; and
   a switching element electrically connected with said second transparent electrode.

10. The liquid crystal display in claim 9, wherein said first and second transparent electrode is made of same material.

11. The liquid crystal display in claim 10, wherein the first and second transparent electrode is indium tin oxide.

12. The liquid crystal display in claim 10, wherein said second insulating layer is smaller in dielectric constant than said first insulating layer.

13. The liquid crystal display in claim 12, said second insulating layer is dielectric having a dielectric constant of about 2.5 to about 3.6.

14. The liquid crystal display in claim 13, wherein said second insulating layer is a photoresist film.

15. The liquid crystal display in claim 14, wherein said photoresist film has a thickness of about 1 $\mu$m to about 3 $\mu$m.

16. The liquid crystal display in claim 9, wherein said transparent insulating substrate is a glass substrate.

17. The liquid crystal display in claim 9, wherein said switching element is a thin film transistor.

18. The liquid crystal display in claim 9, wherein said second portion of the first electrode is a quadrangle plate.

19. The liquid crystal display in claim 18, wherein said second electrode is smaller in area than said first electrode, and is disposed within said first electrode.

20. A method for manufacturing a liquid crystal display comprising a first capacitor formed by double layer structured transparent pixel electrodes formed on a transparent insulating substrate; and a second capacitor formed by double layer structured first and second electrodes, said first and second capacitors being electrically connected with a thin film transistor comprising source, drain, and gate electrodes, the method comprising the steps of:
   forming a first electrode, a gate bus line, and a gate electrode on a transparent insulating substrate, the first electrode being arranged parallel to said gate bus line, a first interval apart from said gate bus line;
   forming a first insulating layer on a first resultant substrate including said gate bus line and said first electrode;
   forming a semiconductor layer on a selected portion of an upper surface of said first insulating layer over said gate electrode;
   forming a first through hole in said first insulating layer such that a selected portion of said first electrode underlying said first insulating layer is exposed;
   forming a first transparent electrode in contact with said first electrode through said first through hole on said first insulating layer;
   simultaneously forming a second electrode, a data bus line orthogonal to said gate bus line, and being apart from said first transparent electrode, and source and drain electrodes apart from each other on said selected portions of said upper surface of said first insulating layer;
   forming a second insulating layer on a second resultant substrate including at least said drain electrode and said second electrode;

forming a second through hole exposing a selected portion of said drain electrode, and a third through hole exposing a selected portion of said second electrode in said second insulating layer; and forming a second transparent electrode in contact with said drain electrode through said second through hole and said second electrode through said third through hole on said second insulating layer, wherein said second transparent electrode is partially overlapped with said gate bus line and said data bus line.

21. The method in claim 20, wherein said second insulating layer is smaller in dielectric constant than said first insulating layer.

22. The method in claim 20, wherein said second insulating layer has a dielectric constant of about 2.5 to about 3.6.

23. The method in claim 20, wherein said second insulating layer is formed by spin-coating a photoresist film at a thickness of about 1–3 $\mu$m.

24. The method in claim 20, wherein said first electrode is same material with said first and second transparent electrodes.

25. The method in claim 24, wherein said first electrode, said first and second transparent electrodes are made of indium tin oxide.

* * * * *

UNITED STATES PATENT AND TRADEMARK OFFICE
CERTIFICATE OF CORRECTION

PATENT NO.     : 5,923,390
DATED          : July 13, 1999
INVENTOR(S)    : Jung Mok Jun et al.

It is certified that error appears in the above-identified patent and that said Letters Patent is hereby corrected as shown below:

Title page,
Item [75], Inventors, the name of the inventors should read:
-- Jung Mok Jun; Deuk Su Lee; Bong Yeol Ryu --

Column 7,
Line 14, delete "line" and insert -- "lines" --.

Signed and Sealed this

Twenty-eighth Day of October, 2003

JAMES E. ROGAN
*Director of the United States Patent and Trademark Office*